(12) United States Patent
Kano (10) Patent No.: US 8,774,808 B2
(45) Date of Patent: Jul. 8, 2014

(54) RADIO BASE STATION AND COMMUNICATION CONTROL METHOD

(75) Inventor: Jun Kano, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 141 days.

(21) Appl. No.: 13/387,706

(22) PCT Filed: Jul. 29, 2010

(86) PCT No.: PCT/JP2010/062838
§ 371 (c)(1),
(2), (4) Date: Jan. 27, 2012

(87) PCT Pub. No.: WO2011/013769
PCT Pub. Date: Feb. 3, 2011

(65) Prior Publication Data
US 2012/0142387 A1  Jun. 7, 2012

(30) Foreign Application Priority Data
Jul. 29, 2009 (JP) .................................. 2009-177105

(51) Int. Cl.
*H04W 76/00* (2009.01)

(52) U.S. Cl.
USPC .......................................... 455/436; 370/331

(58) Field of Classification Search
USPC .......... 455/436, 437, 442, 450; 370/329, 331, 370/335
See application file for complete search history.

(56) References Cited

U.S. PATENT DOCUMENTS

| 7,769,384 B2 | 8/2010 | Lee et al. |
| 7,873,359 B2 | 1/2011 | Lee et al. |
| 2004/0266474 A1 | 12/2004 | Petrus |
| 2009/0279507 A1 | 11/2009 | Kanazawa et al. |
| 2010/0056129 A1 | 3/2010 | Kono |

FOREIGN PATENT DOCUMENTS

| JP | H10-28281 A | 1/1998 |
| JP | 2003-032725 A | 1/2003 |
| JP | 2004-207840 A | 7/2004 |
| JP | 2006-020270 A | 1/2006 |
| JP | 2007-158890 A | 6/2007 |
| JP | 2007-521745 A | 8/2007 |
| JP | 2007-527177 A | 9/2007 |
| JP | 2008-211663 A | 9/2008 |
| WO | 2005/084146 A2 | 9/2005 |
| WO | 2007/069319 A1 | 6/2007 |

OTHER PUBLICATIONS

Japanese Office Action "Notification of Reasons for Refusal" dated Apr. 2, 2013, which corresponds to Japanese Patent Application No. 2011-524837 and is related to U.S. Appl. No. 13/387,706 with translation.
International Search Report; PCT/JP2010/062838; Sep. 21, 2010.
Nokia, Agenda Item 5.10.1, Forwarding Instant, 3GPP TSG-RAN WG2 Meeting #57bis, St. Julian's Malta, Mar. 26-30, 2007.
Japanese Office Action "Notification of Reasons for Refusal" dated Nov. 6, 2012, which corresponds to Japanese Patent Application No. 2011-524837 and is related to U.S. Appl. No. 13/387,706 with translation.
An Office Action; "Notice of Reason for Rejection," issued by the Japanese Patent Office on Oct. 22, 2013, which corresponds to Japanese Patent Application No. 2011-524837 and is related to U.S. Appl. No. 13/387,706 with English statement of relevance.

*Primary Examiner* — Sam Bhattacharya
(74) *Attorney, Agent, or Firm* — Studebaker & Brackett PC (57) ABSTRACT

When receiving a connection request from a radio terminal (20), a radio base station (10-1) transmits a resource reservation request to a radio base station (10-2) and a radio base station (10-3) if a resource cannot be reserved in the radio base station (10-1), and receives a resource reservation response indicating whether or not the resource can be reserved. When the resource can be reserved in the radio base station (10-2) or the radio base station (10-3), the radio base station (10-1) establishes a service channel via the radio base station (10-1) and performs control for causing the radio terminal (20) to perform a handover to the radio base station (10-2) or the radio base station (10-3).

8 Claims, 4 Drawing Sheets

RADIO BASE STATION AND COMMUNICATION CONTROL METHOD

TECHNICAL FIELD

The present invention relates to a radio base station performing radio communication with a radio terminal and to a communication control method in the radio base station.

BACKGROUND ART

A radio communication system employing OFDMA-FDD such as a radio communication system based on LTE (Long Term Evolution) or the like is currently under development of specifications by the 3GPP (Third Generation Partnership Project). In such a radio communication system, the arrangement of radio base stations and sectors is determined such that carrier frequencies can be different between neighboring sectors in order to prevent interference between sectors formed by different radio base stations or sectors formed by a single radio station due to overlap of frequencies (carrier frequencies) used for radio communications.

For example, suppose a case where each of multiple radio base stations forms a single sector and where the sectors formed by the radio base stations have respectively different carrier frequencies. In this case, at the start of service use, a radio terminal receives broadcast signals transmitted from the radio base stations, compares reception levels of the radio signals with each other, and thereby selects the radio base station most suitable as a connection destination. Further, the radio terminal transmits a connection request to the selected radio base station. If a radio resource is available for the radio terminal, the radio base station having received the connection request allocates the radio resource to establish connection with the radio terminal (for example, see Patent Document 1).

PRIOR ART DOCUMENT

Patent Document

PATENT DOCUMENT 1: Japanese Patent Application Publication No. 2004-207840

SUMMARY OF THE INVENTION

In recent years, development of a radio communication technique has led to a wide variety of services (applications) using radio communication. Various services are provided, such as Voice over IP which is voice communication over IP protocols, a video phone, HTTP, and FTP, for example. Such a wide variety of the services leads to the diversification of the qualities required to implement the services from one service to another.

For example, the HTTP service is required to achieve an instantaneously high throughput but is not required to continuously maintain the high throughput so much. Thus, the HTTP service is suitable for a case where many radio terminals share a high-speed communication path. In contrast, the Voice over IP is not required to achieve an instantaneously high throughput so much but required to maintain a constant throughput. In addition, the video phone is required to maintain a high throughput continuously.

As described above, the qualities required to implement the services varies among the services. For this reason, the radio base station may fail to reserve a resource required to implement a service for the radio terminal.

In this case, upon receipt of a response indicating that the resource is unavailable, from the radio base station, the radio terminal retransmits the connection request to a different radio base station. Since such processing is repeated until any radio base station reserves a resource, it takes time to establish connection of the radio terminal. In addition, since radio communications related to the resource reservation are performed between the radio terminal and each radio base station, traffic in a radio section is increased.

In view of the aforementioned problems, the present invention aims to provide a radio base station and a communication control method which are capable of reducing a time required to establish connection of a radio terminal at the start of service use while restraining traffic in the radio section.

Means for Solving the Problems

The present invention has the following features to solve the problems described above. First of all, a first feature of the present invention is summarized as a radio base station (radio base station 10-1) configured to perform radio communication with a radio terminal (radio terminal 20), the radio base station comprising: a connection request receiver (connection-request reception processor 152) configured to receive a connection request transmitted from the radio terminal, wherein the connection request including a service type which is information on a quality required to implement a service; a resource reservation request transmitter (resource-reservation-request transmission processor 156) configured to transmit a reservation request of a resource to a candidate radio base station which is a candidate for a connection destination of the radio terminal, the reservation request including the service type; a response receiver (response reception processor 158) configured to receive a response indicating whether the resource is available to the candidate radio base station; and a handover instruction transmitter (handover controller 162) configured to transmit, to the radio terminal, an instruction to perform a handover to the candidate radio base station.

When receiving a connection request including a service type from a radio terminal at the start of a service used by the radio terminal, such a radio base station transmits a request to reserve a resource to a candidate radio base station which is a candidate for a connection destination of the radio terminal. Further, when receiving a response to the request to reserve the resource, the radio base station instructs the radio terminal to perform a handover to the candidate radio base station.

The radio base stations are generally connected to each other through a wired line having higher speed and reliability than those of a wireless line. Thus, when one of the radio base stations performs processing related to resource reservation for the radio terminal on behalf of the radio terminal, a time required to establish connection of the radio terminal can thereby be reduced.

Moreover, the radio base station establishes connection of the radio terminal with the radio base station itself in advance and thereafter instructs the radio terminal to perform a handover to the candidate radio base station. Thereby, connection can be established quickly. Also in this respect, a time required to establish the connection of the radio terminal can be reduced.

Further, the radio base station performs the processing related to resource reservation for the radio terminal on behalf of the radio terminal, and thereby increase of traffic in a radio section between the radio terminal and the radio base station can be restrained.

In a second feature of the present invention, the radio base station further comprises a candidate radio-base-station selector (candidate radio-base-station selector 154) configured to select the candidate radio base station if the resource in the radio base station itself is not available.

In a third feature of the present invention, the candidate radio-base-station selector selects a sender of a predetermined signal received by the radio terminal as the candidate radio base station.

In a fourth feature of the present invention, the candidate radio-base-station selector selects the candidate radio base station from among a plurality of other radio base stations which are senders of respective predetermined signals received by the radio terminal, in an order of the qualities of radio communication of the radio terminal with the other radio base stations.

In a fifth feature of the present invention, the candidate radio-base-station selector selects the candidate radio base station existing within a predetermined area from the radio base station itself.

In a sixth feature of the present invention, the candidate radio-base-station selector selects the candidate radio base station of other radio base stations existing within the predetermined area around the radio base station itself in an order of the distances between the other radio base stations and the radio terminal.

In a seventh feature of the present invention, the radio base station further comprises a connection establisher (service-channel establisher 160) configured to establish connection of the radio terminal with the radio base station itself if the response indicates that the resource in the candidate radio base station is available.

An eighth feature of the present invention is summarized as a communication control method performed in a radio communication system including a radio base station and a radio terminal, comprising: transmitting, from the radio terminal, a connection request including a service type which is information on a quality required to implement a service; receiving the connection request at the radio base station; transmitting a reservation request of a resource from the radio base station to a candidate radio base station which is a candidate for a connection destination of the radio terminal, the reservation request including the service type; receiving, at the radio base station, a response indicating whether the resource is available to the candidate radio base station; and transmitting, from the radio base station to the radio terminal, an instruction to perform a handover to the candidate radio base station.

Effect of the Invention

According to the present invention, a time required to establish connection of a radio terminal at the start of service use can be reduced while traffic in a radio section is restrained.

DESCRIPTION OF THE EMBODIMENTS

Next, a description is given of an embodiment of the present invention with reference to the drawings. Specifically, the description is given of (1) Schematic Configuration of Radio Communication System, (2) Configuration of Radio Base Station, (3) Operation of Radio Communication System, (4) Advantageous Effect, and (5) Other Embodiment. Note that, in the following description of the drawings in the embodiment, same or similar reference numerals denote same or similar elements and portions.

(1) Schematic Configuration of Radio Communication System

Figure 1:
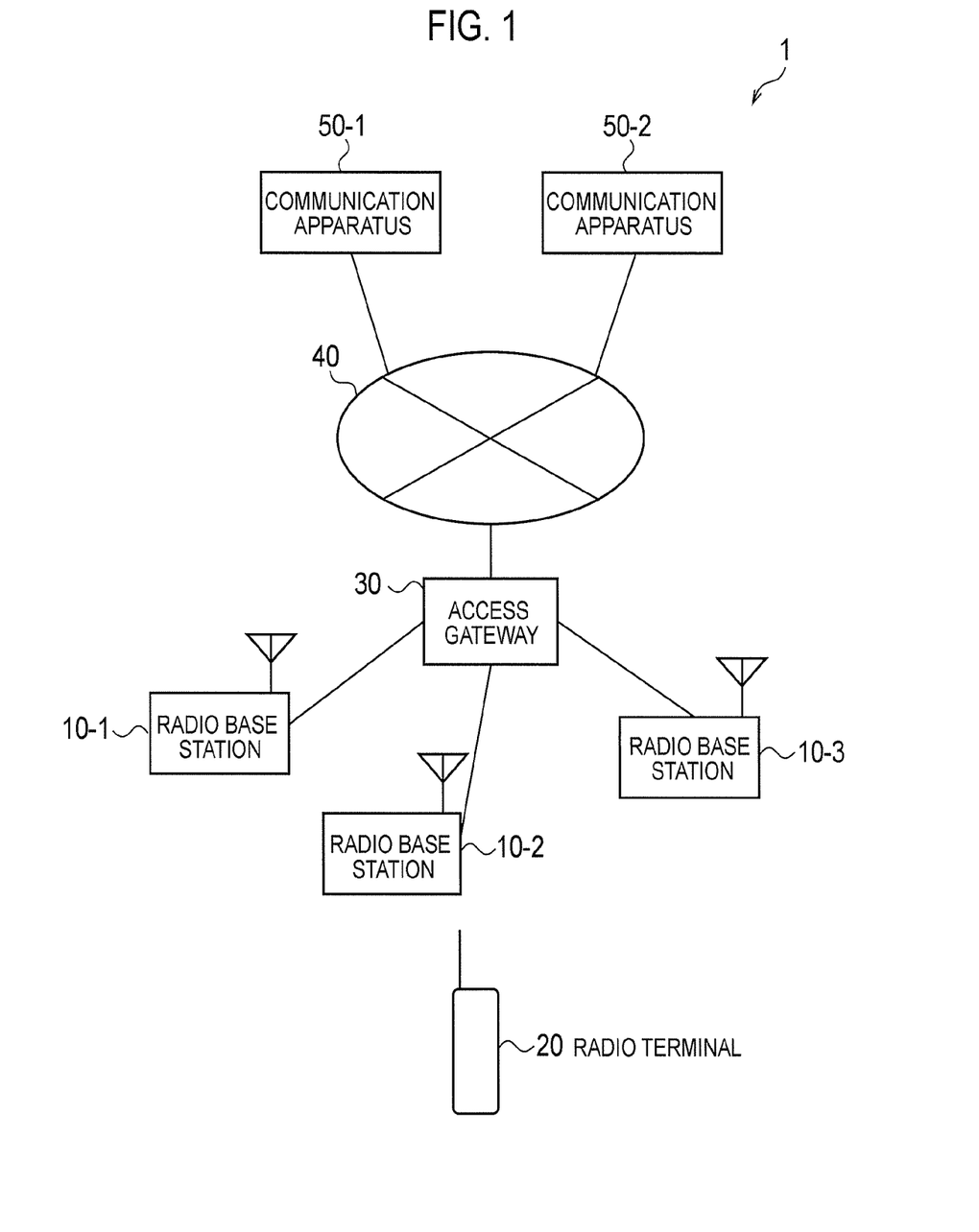
FIG. 1 is an overall schematic configuration diagram of a radio communication system according to an embodiment of the present invention.

FIG. 1 is an overall schematic configuration diagram of a radio communication system according to an embodiment of the present invention. In the embodiment, a radio communication system 1 is configured by using an LTE technique. The radio communication system 1 includes a radio base station 10-1, a radio base station 10-2, a radio base station 10-3, a radio terminal 20, an access gateway 30 which is a transfer controller provided in a core network as a higher network, a public network 40 such as the Internet, and a communication apparatus 50-1 and a communication apparatus 50-2 which are communication partners of the radio terminal 20. Note that the radio base station 10-1 to the radio base station 10-3 each form a single sector in this embodiment.

The radio base station 10-1 to the radio base station 10-3 are each connected to the access gateway 30. The access gateway 30, the communication apparatus 50-1, and the communication apparatus 50-2 are connected to the public network 40. Radio communications are performed between each of the radio base station 10-1 to the radio base station 10-3 and the radio terminal 20. Thereby, the radio terminal 20 can use various services such as the Voice over IP, the video phone, the HTTP, and the FTP.

(2) Configuration of Radio Base Station

Figure 2:
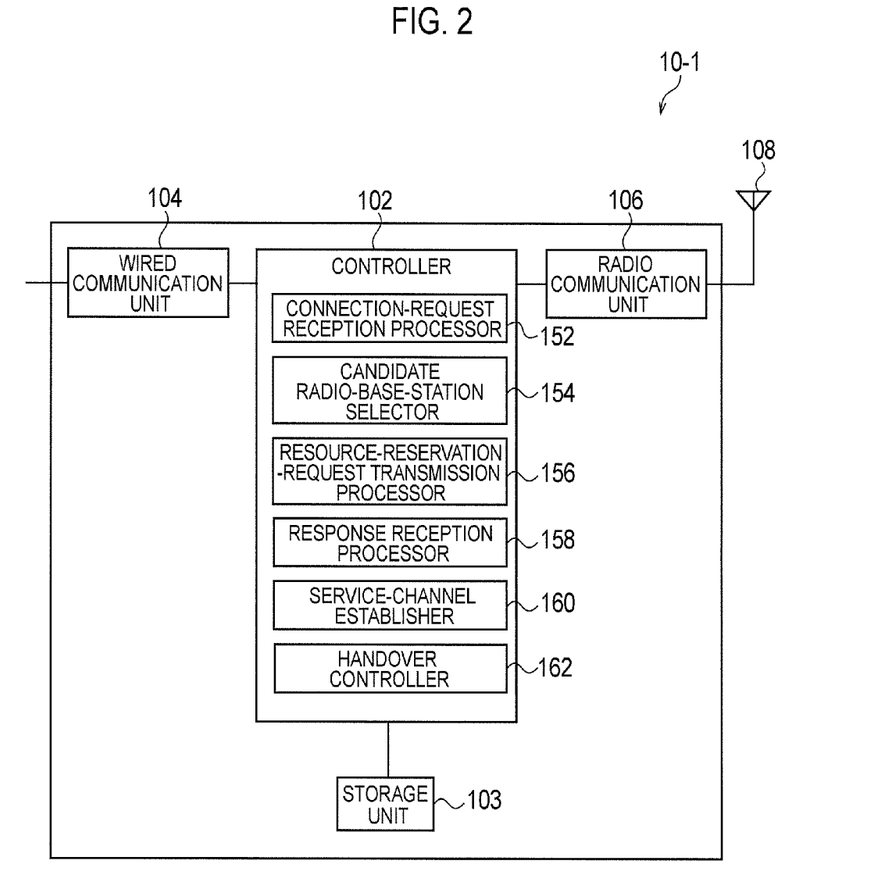
FIG. 2 is a configuration diagram of a radio base station according to the embodiment of the present invention.

FIG. 3 is a diagram showing a configuration of the radio base station. The radio base station 10-1 includes a controller 102, a storage unit 103, a wired communication unit 104, a radio communication unit 106, and an antenna 108. Note that the radio base station 10-2 and the radio base station 10-3 also have the same configuration as that of the radio base station 10-1.

The controller 102 is configured by, for example, a CPU, and controls various functions which the radio base station 10-1 has. The storage unit 103 is configured by, for example, a memory, and stores various information used for control and the like by the radio base station 10-1.

The wired communication unit 104 is connected to the access gateway 30 through a wired line. The radio communication unit 106 includes an RF circuit, a baseband circuit, and the like, performs modulation and demodulation, and coding and decoding, and transits and receives radio signals from and to the radio terminal 20 through the antenna 108.

When receiving a connection request made by the radio terminal 20 at the start of service use by the radio terminal 20, the radio base station 10-1 inquires the radio base station 10-2 or the radio base station 10-3 whether or not a resource is available, through the access gateway 30. In this embodiment, a resource is a radio resource and a hardware resource in the radio base stations.

Thereafter, the radio base station 10-1 receives a response from the radio base station 10-2 or the radio base station 10-3. When the response indicates that the resource is available, the radio base station 10-1 establishes a service channel between the radio terminal 20 and the communication apparatus 50-1 or the communication apparatus 50-2 through the radio base station 10-1 itself, the service channel being a communication path in an application layer.

Further, the radio base station 10-1 performs control for causing the radio terminal 20 to perform a handover to the radio base station 10-2 or the radio base station 10-3 which can reserve the resource.

In order to perform the aforementioned processing, the controller 102 includes a connection-request reception processor 152, a candidate radio-base-station selector 154, a resource-reservation-request transmission processor 156, a response reception processor 158, a service-channel establisher 160, and a handover controller 162.

Each of the radio base station 10-1 to the radio base station 10-3 regularly transmits a broadcast signal to the sector formed by the radio base station itself. When receiving the broadcast signal from each of the radio base station 10-1 to the radio base station 10-3 after the radio terminal 20 is turned on, the radio terminal 20 measures a reception level of the broadcast signal (for example, a reception electric field strength) and extracts a base station ID of the corresponding one of the radio base station 10-1 to the radio base station 10-3 included in the broadcast signal, as information on a sender thereof.

Further, the radio terminal 20 generates or updates and saves therein a radio base station list listing the base station IDs of the radio base station 10-1 to the radio base station 10-3 which are senders in descending order (in an order from the best) of the reception level of the broadcast signal corresponding to the radio base station. At this time, the radio terminal 20 may include, in the base station list, a base station ID of only a radio base station having a higher reception level of a broadcast signal corresponding to the radio base station than a predetermined value.

Further, the radio terminal 20 selects the highest radio base station in the base station list, that is, a radio base station (the radio base station 10-1 herein) having the highest reception level of the corresponding broadcast signal. The selected radio base station is a standby target radio base station. Further, the radio terminal 20 transitions to a standby state.

Thereafter, when a user of the radio terminal 20 performs an operation of a request to start the service by using an unillustrated operation unit, the radio terminal 20 transmits a connection request to the radio base station 10-1 which is the standby target radio base station.

The connection request includes a service type which is information on a quality required to implement the service. In this embodiment, the service type includes a radio resource band (a required radio resource band) required to be occupied in using the service, a throughput (a required throughput) required to be secured in using the service, and an ROHC type (ROHC type information) as a header compression algorithm used in using the service.

The connection-request reception processor 152 in the controller 102 of the radio base station 10-1 receives the connection request from the radio terminal 20 through the antenna 108 and the radio communication unit 106.

The candidate radio-base-station selector 154 extracts the service type included in the connection request. Next, the candidate radio-base-station selector 154 determines whether or not the radio base station 10-1 can reserve a resource for the service type.

Figure 3:
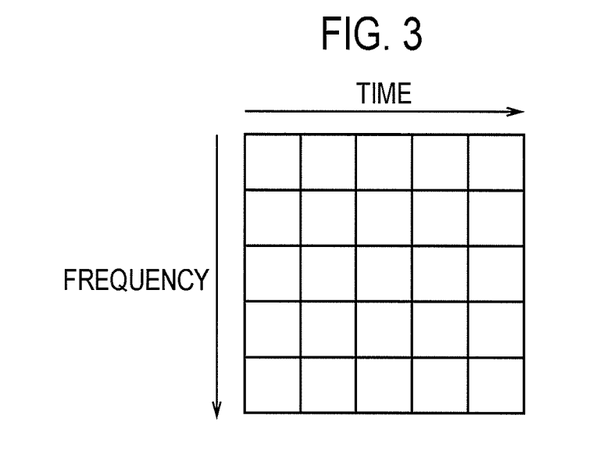
FIG. 3 is a diagram showing an example of a radio resource managed by the radio base station according to the embodiment of the present invention.

FIG. 3 is a diagram showing an example of a radio resource managed by the radio base station 10-1. As shown in FIG. 3, the radio resource is formed by resource blocks obtained by grouping some of resource elements divided in a time direction and a frequency direction. Each of the resource blocks is a minimum unit of allocation thereof to the radio terminal 20.

Specifically, the storage unit 103 stores the number of unused resource blocks forming the radio resource and an availability state of a processing function related to the ROHC. The number of unused resource blocks and the availability state of the processing function related to the ROHC are occasionally updated, the processing function being a function of the controller 102.

The candidate radio-base-station selector 154 determines whether or not the radio base station 10-1 can allocate the radio terminal 20 a necessary number of resource blocks to implement the service, the resource blocks satisfying the required radio resource band and the required throughput which are the service types. Meanwhile, the larger the required radio resource band which is the service type, the larger the number of resources required to implement the service. In addition, the larger the required throughput which is the service type, the larger the number of resources required to implement the service. For example, suppose a case where the radio base station 10-1 allocates the radio terminal 20 the necessary number of resource blocks to implement the service which satisfy the required radio resource band and the required throughput of the service types, and where the ratio of unused resource blocks thereby becomes lower than a predetermined value. For this case, the candidate radio-base-station selector 154 determines that the resource blocks cannot be allocated.

Note that when a service used by a radio terminal other than the radio terminal 20 is of a so-called best effort type, the candidate radio-base-station selector 154 may determine whether or not a necessary number of resource blocks to implement the service which satisfy the required radio resource band information and the required throughput of the service types can be allocated to the radio terminal 20, while increasing the number of unused resource blocks forming the radio resource by reducing resource blocks to be used for the service.

Moreover, the candidate radio-base-station selector 154 determines whether or not the ROHC-related processing function corresponding to the ROHC type which is the service type is currently executed.

When the radio base station 10-1 can reserve the resource for the service type, the radio base station 10-1 allocates the resource to the radio terminal 20 in the same manner as in a conventional manner. Further, a service channel between the radio terminal 20 and the communication apparatus 50-1 or the communication apparatus 50-2 through the radio base station 10-1 is established, so that the service is started.

On the other hand, when the radio base station 10-1 cannot reserve the resource for the service type, the candidate radio-base-station selector 154 transmits a neighboring base-station monitoring information request through the radio communication unit 106 and the antenna 108. Upon receipt of the neighboring base-station monitoring information request, the radio terminal 20 sends the radio base station 10-1 a neighboring base-station monitoring information response including the base station list.

The candidate radio-base-station selector 154 receives the neighboring base-station monitoring information response through the antenna 108 and the radio communication unit 106. Next, the candidate radio-base-station selector 154 selects a radio base station corresponding to the base station ID ranked highest in the base station IDs except the base station ID of the radio base station 10-1, from among the radio base stations listed in the base station list included in the neighboring base-station monitoring information response. The selected radio base station is a radio base station which is a connection destination of the radio terminal 20, specifically, a radio base station (a candidate radio base station) through which a service channel between the radio terminal 20 and the communication apparatus 50-1 or the communication apparatus 50-2 is established. The radio base station 10-2 or the radio base station 10-3 is herein the candidate radio base station.

Next, the resource-reservation-request transmission processor 156 sends a resource reservation request including the service type included in the connection request from the radio terminal, to the candidate radio base station through the wired communication unit 104 and the access gateway 30.

Upon receipt of the resource reservation request, the candidate radio base station extracts the service type included in the resource reservation request. Further, the candidate radio base station determines whether or not the candidate radio base station itself can reserve a resource for the service type. A specific determination method is the same as that performed by the candidate radio-base-station selector 154 in the controller 102 of the radio base station 10.

Figure 4:
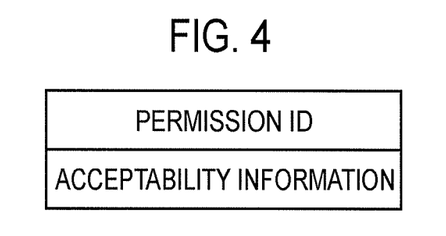
FIG. 4 is a diagram showing an example of a resource reservation response according to the embodiment of the present invention.

When the candidate radio base station itself can reserve the resource for the service type, the candidate radio base station sends the radio base station 10-1 a resource reservation response including a permission ID and information (acceptability information) indicating that the radio terminal 20 is acceptable, as shown in FIG. 4.

On the other hand, when the candidate radio base station itself cannot reserve the resource for the service type, the candidate radio base station sends the radio base station 10-1 a resource reservation response including information (acceptance rejection information) indicating the acceptance of the radio terminal 20 is rejected.

The response reception processor 158 in the controller 102 of the radio base station 10-1 receives the resource reservation response through the access gateway 30 and the wired communication unit 104.

The candidate radio-base-station selector 154 determines whether or not the resource reservation response includes the acceptance rejection information. When the resource reservation response includes the acceptance rejection information, the candidate radio-base-station selector 154 selects a radio base station corresponding to a base station ID which is a base station ID other than the base station ID of the radio base station 10-1 and which is ranked highest in base station IDs of radio base stations having not received the resource reservation request at that time point, from among the radio base stations listed in the base station list included in the neighboring base-station monitoring information response. The selected radio base station is the candidate radio base station.

Thereafter, the same processing as described above is performed. In sum, the resource-reservation-request transmission processor 156 sends the candidate radio base station the resource reservation request through the wired communication unit 104 and the access gateway 30.

Upon receipt of the resource reservation request, the candidate radio base station extracts the service type included in the resource reservation request, and determines whether or not the candidate radio base station itself can reserve a resource for the service type. Further, the candidate radio base station sends the radio base station 10-1 a resource reservation response in accordance with the determination result.

The response reception processor 158 in the controller 102 of the radio base station 10-1 receives the resource reservation response through the access gateway 30 and the wired communication unit 104.

Meanwhile, the service-channel establisher 160 determines whether or not the resource reservation response includes the permission ID and the acceptability information. When the resource reservation response includes the permission ID and the acceptability information, the service-channel establisher 160 sends the radio terminal 20 a connection response including the acceptability information through the radio communication unit 106 and the antenna 108. Subsequently, the service-channel establisher 160 performs resource allocation to form a radio link between the radio base station 10-1 and the radio terminal 20. Further, the service-channel establisher 160 establishes a temporary service channel between the radio terminal 20 and the communication apparatus 50-1 or the communication apparatus 50-2 through the radio base station 10-1. Thereby, the service is started tentatively.

Thereafter, the handover controller 162 sends the candidate radio base station a handover request through the wired communication unit 104 and the access gateway 30, the handover request including the permission ID included in the resource reservation response and a terminal ID of the radio terminal 20 which is a sender of the connection request.

The candidate radio base station receives the handover request. Next, when completing a preparation for a handover, that is, a preparation for accepting the radio terminal 20, the candidate radio base station sends the radio base station 10-1 a handover response including information indicating that the acceptance preparation is completed.

Figure 5:
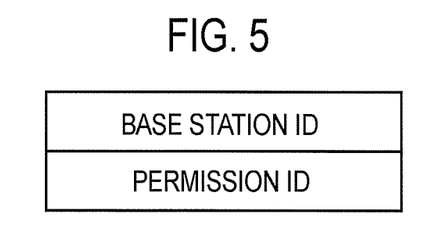
FIG. 5 is a diagram showing an example of a handover instruction according to the embodiment of the present invention.

The handover controller 162 in the controller 102 of the radio base station 10-1 receives the handover response through the access gateway 30 and the wired communication unit 104. Next, the handover controller 162 generates a handover instruction including the permission ID included in the resource reservation response and the base station ID, of the candidate radio base station, included as information on a sender of the handover response. FIG. 5 is an example of the handover instruction. Further, the handover controller 162 sends the handover instruction to the radio terminal 20 through the radio communication unit 106 and the antenna 108.

Subsequently, handover processing is performed between the radio terminal 20 and the candidate radio base station. Specifically, upon receipt of the handover instruction, the radio terminal 20 generates a connection request including the permission ID included in the handover instruction and the service type. Further, the radio terminal 20 sends the connection request to the candidate radio base station corresponding to the base station ID included in the handover instruction. Upon receipt of the connection request, the candidate radio base station sends the radio terminal 20 a connection response including the acceptability information.

Thereafter, the candidate radio base station performs resource allocation to form a radio link between the candidate radio base station and the radio terminal 20. Further, the candidate radio base station establishes a service channel between the radio terminal 20 and the communication apparatus 50-1 or the communication apparatus 50-2 through the candidate radio base station. Thereby, the handover of the radio terminal 20 from the radio base station 10-1 to the candidate radio base station is completed. Thereby, the service is started while the resource for the service type is reserved.

(3) Operation of Radio Communication System

Figure 6:
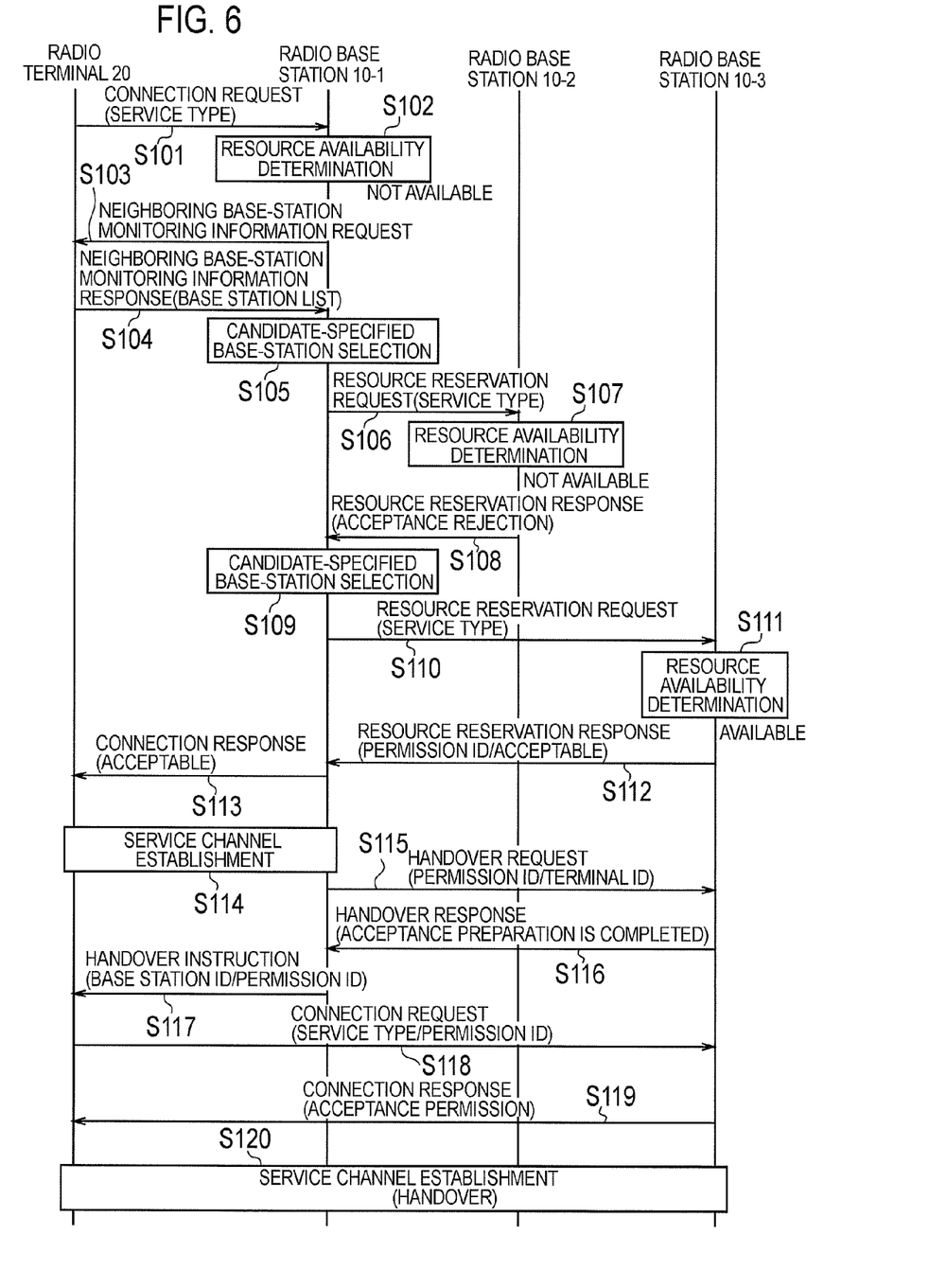
FIG. 6 is a sequence diagram showing an operation of a radio communication system according to the embodiment of the present invention.

FIG. 6 is a sequence diagram showing an operation of the radio communication system 1. In the following description, the order of the reception levels of the broadcast signals received by the radio terminal 20 from the radio base station 10-1 to the radio base station 10-3 is the radio base station 10-1, the radio base station 10-2, and the radio base station 10-3, from the highest.

In Step S101, the radio terminal 20 sends a connection request including a service type to the radio base station 10-1 which is a standby target radio base station. The radio base station 10-1 receives the connection request.

In Step S102, the radio base station 10-1 determines whether or not the radio base station 10-1 can reserve a resource for the service type included in the connection request. At this time, the radio base station 10-1 determines that the resource for the service type included in the connection request is not available.

In this case, in Step S103, the radio base station 10-1 sends the radio terminal 20 a neighboring base-station monitoring information request. The radio terminal 20 receives the neighboring base-station monitoring information request.

In Step S104, the radio terminal 20 having received the neighboring base-station monitoring information request sends the radio base station 10-1 a neighboring base-station monitoring information response including a base station list. The radio base station 10-1 receives the neighboring base-station monitoring information response.

In Step S105, the radio base station 10-1 selects a candidate radio base station from among radio base stations listed in the base station list included in the neighboring base-station monitoring information response. At this time, the radio base station 10-2 is the candidate radio base station.

In Step S106, the radio base station 10-1 sends a resource reservation request including the service type included in the connection request, to the radio base station 10-2 which is the candidate radio base station. The radio base station 10-2 receives the resource reservation request.

In Step S107, the radio base station 10-2 determines whether or not the radio base station 10-2 can reserve a resource for the service type included in the resource reservation request. At this time, the radio base station 10-2 determines that the resource for the service type included in the resource reservation request is not available.

In this case, in Step S108, the radio base station 10-2 sends the radio base station 10-1 a resource reservation response including acceptance rejection information. The radio base station 10-1 receives the resource reservation response.

In accordance with the inclusion of the acceptance rejection information in the resource reservation response, in Step S109 the radio base station 10-1 selects a next candidate radio base station from among the radio base stations listed in the base station list included in the neighboring base-station monitoring information response. At this time, the radio base station 10-3 is the candidate radio base station.

In Step S110, the radio base station 10-1 sends a resource reservation request including the service type included in the connection request, to the radio base station 10-3 which is the candidate radio base station. The radio base station 10-3 receives the resource reservation request.

In Step S111, the radio base station 10-3 determines whether or not the radio base station 10-3 can reserve a resource for the service type included in the resource reservation request. At this time, the radio base station 10-3 determines that the resource for the service type included in the resource reservation request is available.

In this case, in Step S112 the radio base station 10-3 sends the radio base station 10-1 a resource reservation response including a permission ID and acceptability information. The radio base station 10-1 receives the resource reservation response.

In accordance with the inclusion of the permission ID and the acceptability information in the resource reservation response, in Step S113 the radio base station 10-1 sends the radio terminal 20 a connection response including the acceptability information. The radio terminal 20 receives the connection response.

Thereafter, in Step S114, the radio base station 10-1 performs resource allocation to form a radio link between the radio base station 10-1 and the radio terminal 20. Then, the radio base station 10-1 establishes a temporary service channel between the radio terminal 20 and the communication apparatus 50-1 or the communication apparatus 50-2 through the radio base station 10-1.

In Step S115, the radio base station 10-1 sends a handover request to the radio base station 10-3 which can reserve the resource, the handover request including the permission ID included in the resource reservation response and a terminal ID of the radio terminal 20 which is a sender of the connection request. The radio base station 10-3 receives the handover request.

In Step S116, the radio base station 10-3 sends the radio base station 10-1 a handover response including information indicating that a preparation for accepting the radio terminal 20 is completed. The radio base station 10-3 receives the handover request.

In Step S117, the radio base station 10-1 sends the radio terminal 20 a handover instruction including the permission ID included in the resource reservation response and a base station ID, of the radio base station 10-3, included as information on a sender of the handover response. The radio terminal 20 receives the handover instruction.

In Step S118, the radio terminal 20 sends a connection request to the radio base station 10-3 corresponding to the base station ID included in the received handover instruction, the connection request including the permission ID included in the received handover instruction and the service type. The radio base station 10-3 receives the connection request.

In Step S119, the radio base station 10-3 sends the radio terminal 20 a connection response including the acceptability information. The radio terminal 20 receives the connection response.

Thereafter, in Step S120 the radio base station 10-3 performs resource allocation to form a radio link between the radio base station 10-3 and the radio terminal 20. Then, the radio base station 10-3 establishes a service channel between the radio terminal 20 and the communication apparatus 50-1 or the communication apparatus 50-2 through the radio base station 10-1.

(4) Advantageous Effect

As described above, in the radio communication system 1 according to the embodiment of the present invention, the radio base station 10-1 performs the processing related to resource reservation for the radio terminal 20 on behalf of the radio terminal 20 while communicating with the different radio base station 10-2 and the different radio base station 10-3.

The radio base stations are generally connected through a wired line having higher speed and reliability than those of a wireless line. Thus, when the radio base station 10-1 performs the processing related to resource reservation for the radio terminal 20 on behalf of the radio terminal 20, a time required to establish the service channel in the radio terminal 20 can thereby be reduced. Further, the resource can be reserved appropriately in quick response to change of a use state of the resource.

Moreover, when a resource reservation response indicates that the resource is available, the radio base station 10-1 temporarily establishes a service channel between the radio terminal 20 and the communication apparatus 50-1 or the communication apparatus 50-2 through the radio base station 10-1. Thereafter, the radio base station 10-1 instructs the radio terminal 20 to perform a handover to the radio base station 10-3 which is a candidate radio base station, and makes the radio base station 10-3 establish a service channel between the radio terminal 20 and the communication apparatus 50-1 or the communication apparatus 50-2 through the radio base station 10-3. Thus, the service channel can be established quickly. Also in this respect, a time required to establish the service channel of the radio terminal 20 can be reduced.

Further, the radio base station 10-1 performs the processing related to resource reservation for the radio terminal 20 on behalf of the radio terminal 20, and thereby increase of traffic in a radio section between the radio terminal 20 and each of the radio base station 10-1 to the radio base station 10-3 can be restrained.

Still further, the controller such as the CPU of the radio terminal 20 has a lower processing capacity than that of the radio base station 10-1, and thus reduction of processing burden is required. In addition, restraint of power consumption is required for the radio terminal 20 for a reason of long time use durability or the like.

To meet the requirements, the radio base station 10-1 performs the processing related to resource reservation for the radio terminal 20 on behalf of the radio terminal 20 in this embodiment. Thereby, the processing burden and the power consumption in the radio terminal 20 can be reduced.

(5) Other Embodiment

As described above, the present invention has been described by using the embodiment. However, it should not be understood that the description and drawings which constitute part of this disclosure limit the present invention. From this disclosure, various alternative embodiments, examples, and operation techniques will be apparent for those skilled in the art.

In the aforementioned embodiment, when the radio base station 10-1 having received the connection request from the radio terminal 20 cannot reserve the resource, the radio base station 10-1 acquires the base station list included in the neighboring base-station monitoring response. However, when the radio terminal 20 sends a connection request including the base station list, the radio base station 10-1 may acquire the base station list included in the connection request.

Moreover, in the aforementioned embodiment, the radio base station 10-1 selects a candidate radio base station based on the base station list. However, the storage unit 103 in the radio base station 10-1 may be configured to store location information of radio base stations located within a predetermined area from the radio base station 10-1, and the candidate radio-base-station selector 154 in the controller 102 of the radio base station 10-1 may select the candidate radio base station from among the radio base stations located within the predetermined area from the radio base station 10-1.

In this case, it is preferable that the radio terminal 20 send a connection request including the location information of the radio terminal 20 and that the candidate radio-base-station selector 154 acquire the location information of the radio terminal 20 as well. Thereby, the candidate radio-base-station selector 154 selects a radio base station which is a radio base station other than the radio base station 10-1 and is closest to the radio terminal 20, based on the location information of the radio terminal 20 and the location information of the radio base stations within the predetermined area from the radio base station 10-1. The selected radio base station is the candidate radio base station.

Besides, in the aforementioned embodiment, the radio base station 10-1 communicates with the radio base station 10-2 and the radio base station 10-3 which are the candidate radio base stations through the access gateway 30. However, when a communication path is established directly between the radio base station 10-1 and each of the candidate radio base stations, the radio base station 10-1 may communicate with each of the radio base station 10-2 and the radio base station 10-3 which are the candidate radio base stations through the communication path.

Further, in the aforementioned embodiment, the access gateway 30 is installed as a transfer controller. However, an MME (Mobile Management Entity) may be installed instead of the access gateway 30.

Still further, instead of the radio base station 10-1, the access gateway 30 or the MME may perform the processing related to resource reservation for the radio terminal 20 while communicating with the different radio base stations 10-2 and 10-3.

As described above, it should be understood that the present invention includes various embodiments which are not described herein. Accordingly, the technical scope of the present invention should be limited only by the matters to define the invention in the scope of claims regarded as appropriate based on the disclosure.

Note that the entire content of Japanese Patent Application No. 2009-177105 (filed on Jul. 29, 2009) is incorporated herein by reference.

INDUSTRIAL APPLICABILITY

The radio base station and the communication control method according to the present invention can reduce a time required to establish connection of a radio terminal at the start of service use while restraining traffic in a radio section, and are useful as a radio base station and a communication control method.

The invention claimed is:

1. A radio base station configured to perform radio communication with a radio terminal, the radio base station comprising:
   a connection request receiver configured to receive a connection request transmitted from the radio terminal, wherein the connection request including a service type which is information on a quality required to implement a service;

a resource reservation request transmitter configured to transmit a reservation request of a resource for the service type to a plurality of candidate radio base stations in turn, each of which is a candidate for a connection destination of the radio terminal, the reservation request including the service type;

a response receiver configured to receive a response indicating whether the resource is available to the candidate radio base station;

a candidate radio-base-station selector configured to select one of the plurality of candidate radio base stations if the response indicates that the resource is available to the one of the plurality of candidate radio base stations; and a handover instruction transmitter configured to transmit, to the radio terminal, an instruction to perform a handover to the one of the plurality of candidate radio base stations.

2. The radio base station according to claim 1, further comprising the candidate radio-base-station selector configured to select the candidate radio base station if the resource in the radio base station itself is not available.

3. The radio base station according to claim 2, wherein the candidate radio-base-station selector selects a sender of a predetermined signal received by the radio terminal as the candidate radio base station.

4. The radio base station according to claim 3, wherein the candidate radio-base-station selector selects the candidate radio base station from among a plurality of other radio base stations which are senders of respective predetermined signals received by the radio terminal, in an order of the qualities of radio communication of the radio terminal with the other radio base stations.

5. The radio base station according to claim 2, wherein the candidate radio-base-station selector selects the candidate radio base station existing within a predetermined area from the radio base station itself.

6. The radio base station according to claim 5, wherein the candidate radio-base-station selector selects the candidate radio base station of other radio base stations existing within the predetermined area around the radio base station itself in an order of the distances between the other radio base stations and the radio terminal.

7. The radio base station according to claim 1, further comprising a connection establisher configured to establish connection of the radio terminal with the radio base station itself if the response indicates that the resource in the candidate radio base station is available.

8. A communication control method performed in a radio communication system including a radio base station and a radio terminal, comprising:

transmitting, from the radio terminal, a connection request including a service type which is information on a quality required to implement a service;

receiving the connection request at the radio base station;

transmitting a reservation request of a resource for the service type from the radio base station to a plurality of candidate radio base stations in turn, each of which is a candidate for a connection destination of the radio terminal, the reservation request including the service type;

receiving, at the radio base station, a response indicating whether the resource is available to the candidate radio base station;

selecting one of the plurality of candidate radio base stations if the response indicates that the resource is available to the one of the plurality of candidate radio base stations; and transmitting, from the radio base station to the radio terminal, an instruction to perform a handover to the one of the plurality of candidate radio base station stations.

* * * * *